United States Patent
Cupo et al.

(10) Patent No.: US 6,625,113 B1
(45) Date of Patent: Sep. 23, 2003

(54) DIGITAL SIGNAL FRAME AND INTERLEAVER SYNCHRONIZER

(75) Inventors: Robert L. Cupo, Eatontown, NJ (US); Mohsen Sarraf, Rumson, NJ (US); Mojtaba Shariat, Matawan, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/386,092

(22) Filed: Aug. 30, 1999

(51) Int. Cl.[7] ............................................. H04J 11/00
(52) U.S. Cl. ..................... 370/208; 370/343; 375/260; 375/350
(58) Field of Search ................................ 370/203, 208, 370/209, 343; 375/260, 350, 354

(56) References Cited

U.S. PATENT DOCUMENTS

| | | | | |
|---|---|---|---|---|
| 5,282,222 A | * | 1/1994 | Fattouche et al. | 375/260 |
| 5,995,483 A | * | 11/1999 | Marchok et al. | 370/207 |
| 6,160,791 A | * | 12/2000 | Bohnke | 370/208 |
| 6,181,714 B1 | * | 1/2001 | Isaksson et al. | 370/491 |
| 6,243,413 B1 | * | 6/2001 | Beukema | 375/222 |
| 6,285,654 B1 | * | 9/2001 | Marchok et al. | 370/208 |
| 6,359,926 B1 | * | 3/2002 | Isaksson et al. | 375/219 |
| 6,363,128 B1 | * | 3/2002 | Isaksson et al. | 375/355 |

* cited by examiner

*Primary Examiner*—Ajit Patel
*Assistant Examiner*—Chirag Shah

(57) ABSTRACT

A receiver of digital information typically performs a frame synchronization finction to locate the beginning of a frame of within received information. Frame and interleaver synchronization functions are complex tasks to accomplish, and are made more so when transmitted information is subjected to harsh interference by the environment of the transmission media, e.g., wireless media. Such interference may be sufficiently minimized by filtering the band signal at the receiver in a simple manner to allow receiver processes to perform successfully frame synchronization and interleaver functions on the filtered signal, in which such filtering may be achieved using a simple bandpass filter. Although such filtering renders the received signal sufficiently clean to recover frame synchronization and interleaver signals, it nevertheless corrupts the information carried in the signal, thereby making it extremely difficult to recover the information. This problem is overcome by shifting the unfiltered received signal in the way used to shift the filtered signal to locate the beginning of a frame and thus recover the underlying information.

17 Claims, 4 Drawing Sheets

FILTER CHARACTERISTIC

DIGITAL SIGNAL FRAME AND INTERLEAVER SYNCHRONIZER

FIELD OF THE INVENTION

The invention relates to Orthogonal Frequency Division Multiplexing (OFDM) systems, and is more particularly related to transmitting and receiving digital information within a Frequency Modulated (FM) signal band using OFDM.

BACKGROUND OF THE INVENTION

As is well-known, the center frequencies of adjacent FM bands/channels are separated by 200 kHz. As is also well-known, analog signals within the audio band are typically frequency modulated onto a FM carrier for transmission to a receiver. It is now possible to also transmit information (e.g., analog/digital information) in the upper and lower side bands of a FM carrier signal. This is broadly illustrated in FIG. 1, in which transmitter 105 transmits via antenna 125 an analog host signal supplied by source 110 over a FM carrier (represented by signal $a_1$). It also transmits digital versions of signals supplied by source 115 in the upper and lower side bands (represented by side band signals $b_1$ and $b_2$), respectively, of the FM carrier. We have recognized that it is likely that the host signal, $a_2$, as well as the first adjacent FM signals, $c_1$ and $c_2$, will interfere with the side band signals (represented by the shaded portions of signals $b_3$ and $b_4$) during the transmission of the FM signal from antenna 125 to a receiver antenna 205. Disadvantageously, such interference makes it extremely difficult for receiver 200 to recover the signal transmitted in the side bands, since the inference sorely corrupts the side band signal.

SUMMARY OF THE INVENTION

We have recognized that such interference may be sufficiently minimized by filtering the side band signal at the receiver to allow receiver processes to perform successfully frame synchronization and interleaver functions on the filtered signal. In accordance with an aspect of the invention, such filtering is done using a simple bandpass filter.

We have further recognized that, although such filtering renders the side band signal sufficiently clean to recover frame synchronization and interleaver signals, it nevertheless corrupts the information carried in that signal, thereby making it extremely difficult to recover the information. We deal with this problem by using the filtered version of the received side band signal for frame and interleaver synchronization functions and, after such functions have been performed using a shifted version of the received side band signal to recover such information, all in accordance with an aspect of the invention.

In accordance with another aspect of the invention, the extent of such shifting is determined as a function of the number of signal samples that the filtered signal had to be shifted to obtain frame synchronization, e.g., to locate the beginning of a frame.

These and other aspects of the invention are described in the following detailed description and ensuing claims.

DETAILED DESCRIPTION

The claimed invention will be discussed in the context of a FM system employing an Orthogonal Frequency Division Multiplexing (OFDM) technique for the transmission of data symbols using mutually independent and separated radio frequency (RF) subcarriers. OFDM has several desirable properties; for example, it simplifies or even eliminates equalization problems considerably and has graceful performance degradation. The absence of equalization problems simplifies the implementation of an OFDM system.

Figure 1:
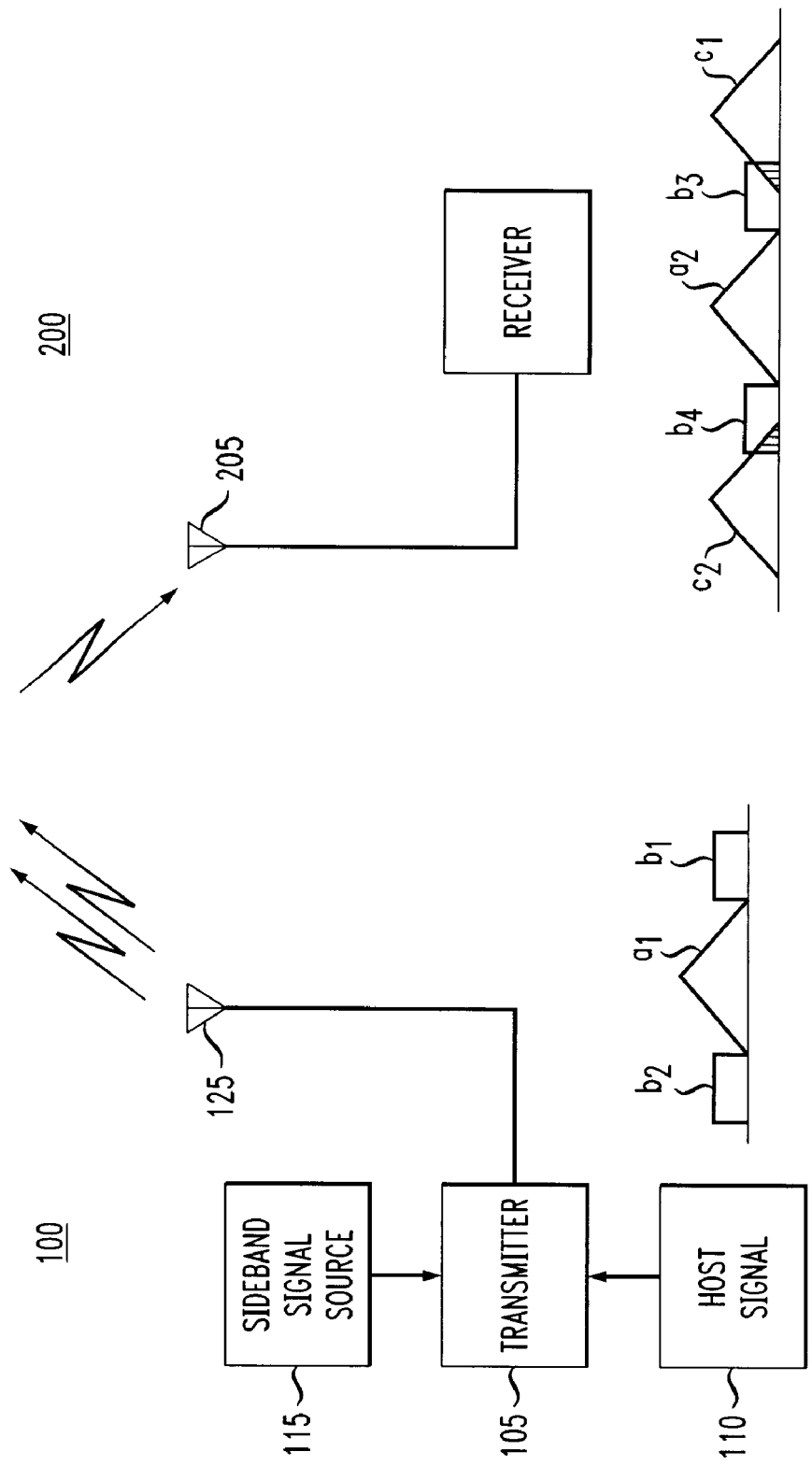
FIG. 1 broad is block diagram of a prior art FM transmission system.
Figure 2:
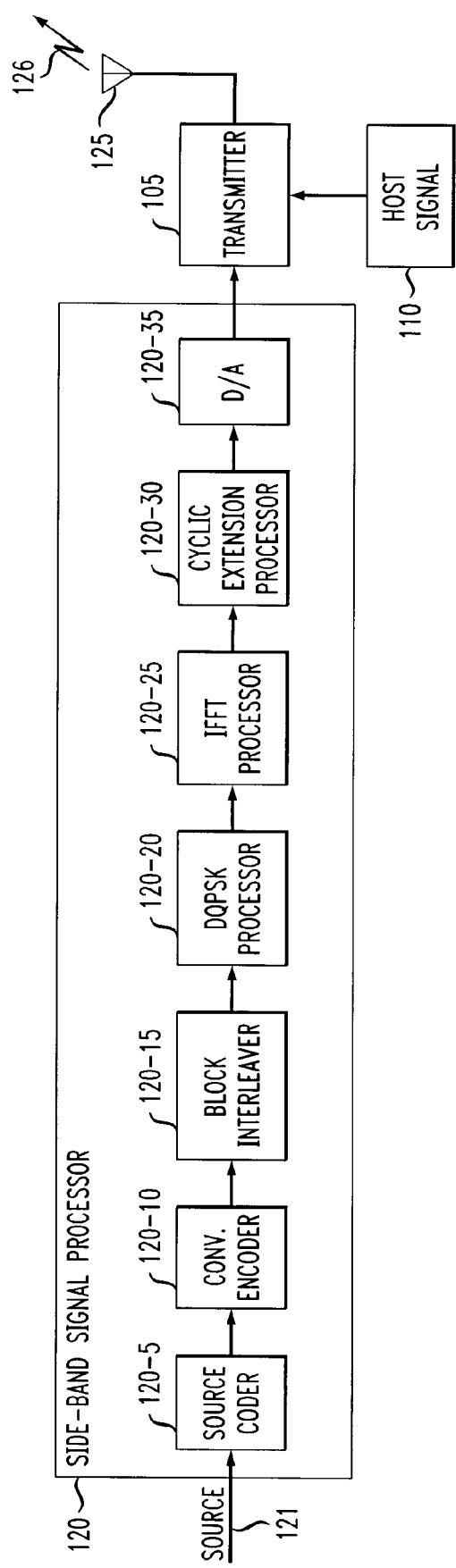
FIG. 2 is a broad block diagram of the side band signal source of FIG. 1.

Turning then to FIG. 2, Side-Band Signal (SBS) processor 120, which is the source of the signal that transmitter 105 transmits in the aforementioned side bands, includes conventional source coder 120-5 which compresses an information signal that is received from a source 121. The information signal may be, for example, a data signal characterizing particular information, or an analog signal, which has been converted, to a digital signal by a conventional analog-to-digital converter circuit (not shown). Such compression may be done in accordance with any one of a number of well-known signal compression schemes, e.g. Huffman encoding. The result of such compression is presented to convolutional encoder 120-10 which re-generates the encoded source information at a higher rate. The output from encoder 120-10 is supplied to conventional block interleaver processor 120-15 which writes the data samples that it receives into a memory buffer row-by-row to form a matrix having, for example, 414 rows and 320 columns of data bits. When it forms one such matrix it then outputs the matrix column by column to perform the bit interleaving function. It also starts the construction of a next matrix in parallel with the processing of the completed matrix. The interleaved data bits are presented to conventional DQPSK processor 120-20, which converts a group of data bits, e.g., 2 bits, into a conventional complex DQPSK symbol. Processor 120-20 also builds a frame of such symbols using so-called zero padding for the insertion of the host signal. A frame of complex symbols is then presented to conventional IFFT processor 125-25 which runs a frame of symbols through an Inverse-Fast-Fourier Transform that converts each such symbol into a complex number formed by a predetermined number of bits, e.g., 16 or 32 bits. The frame of complex numbers is then presented to a conventional cyclic extension processor 120-30.

Processor 120-30, more particularly, performs a so-called cyclic extension function by prepending a predetermined number of the samples appearing at the end of a frame to the beginning of the frame and vice-versa. Processor 120-30 then marks predetermined ones of the frames in the matrix, e.g., frames 0, 10, 340 and 400, as deinterleaver frames by inverting the sign of the cyclic extension prepended to those frames. Processor 120-30 then performs any filtering needed to put the frames in form for transmission over wireless media and supplies the filtered frames, in turn, to conventional digital to analog converter 120-35. Transmitter 105 then combines each such converted frame with the host signal in a conventional manner, amplifies and filters the resulting signal in a conventional manner and then transmits the latter signal over wireless media 126 via antenna 125 for reception by a receiver, such as the receiver shown in FIG. 3.

Figure 3:
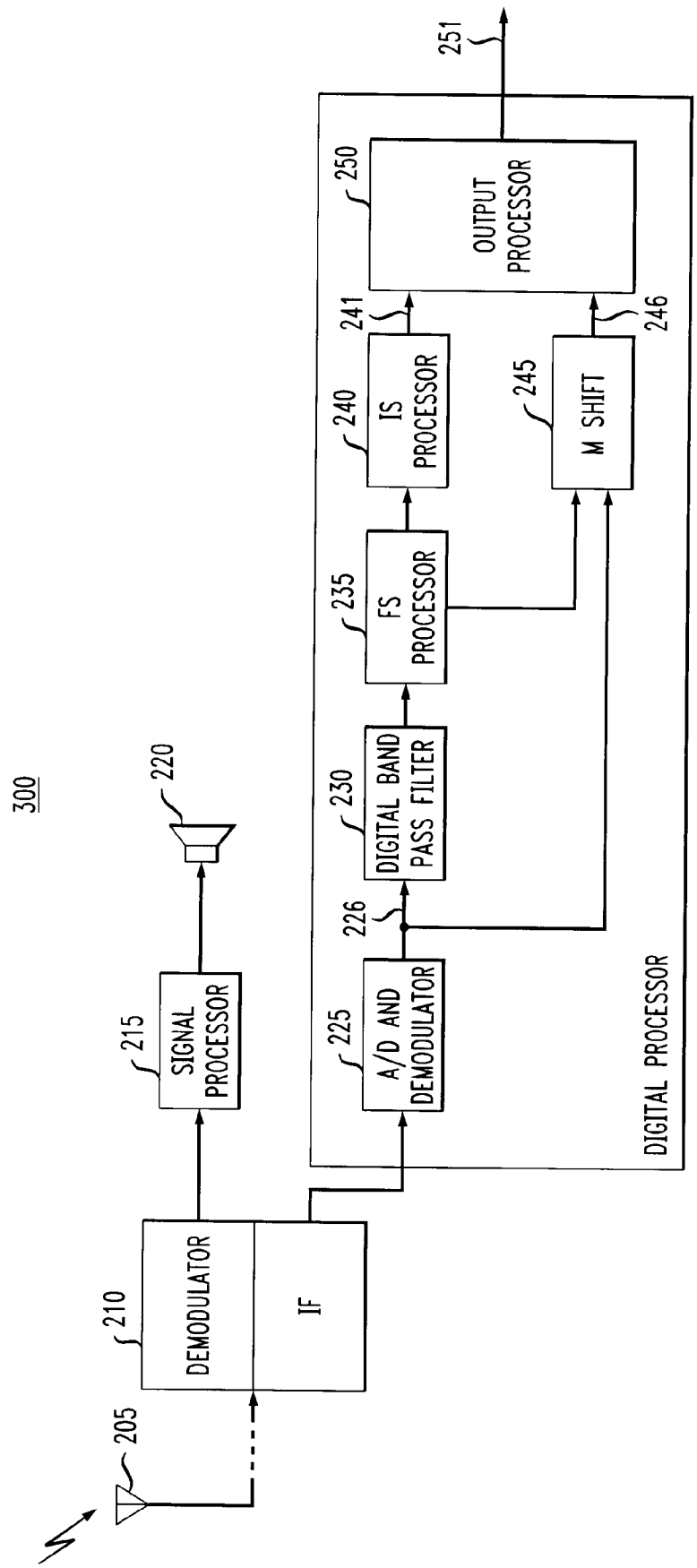
FIG. 3 is broad block diagram of a receiver of a signal transmitted by the transmitter of FIG. 1.
Figure 5:
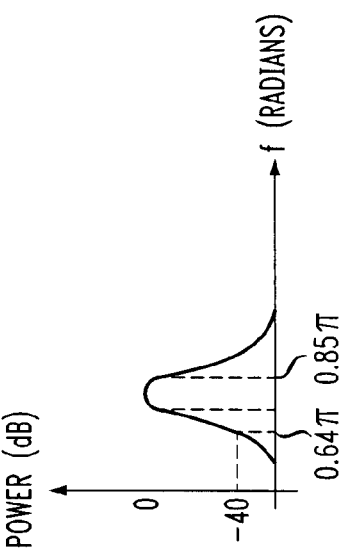
FIG. 5 is a specification of the bandpass filter of FIG. 3.

Receiver 300, FIG. 3, more particularly, includes antenna 205 for receiving the transmitter signal and a conventional front-end receiver section that amplifies, filters, demodulates the received signal and outputs the host signal to a signal processing section 215 and outputs the side band signal to conventional analog-to-digital (A/D) converter circuit 225 which converts the analog signal to digital samples, which are supplied to digital bandpass filter 230 and M shift circuit 245. In illustrative embodiment of the invention, bandpass filter 230 may be a conventional finite impulse response filter having a specification as shown in FIG. 5. The filter removes various noise signals that mixed with the transmitted signal as it propagated through the wireless media. The filtered signal is then supplied to frame synchronization (FS) processor 235 that locates the beginning of a frame using a conventional correlation technique. (As mentioned above, we have recognized that such noise signals corrupt the transmitted signal making it very difficult to perform synchronization and deinterleaver functions successfully. Thus, in accord with an aspect of the invention, we filter the received side band signal to reduce the effect of such noise so that frame and interleaver synchronization functions may be performed successfully.)

FS processor 235 autocorrelates a frame of complex numbers so that a strong peak of energy appears at the beginning of each such frame. Processor 235 then shifts the frame by a predetermined number of samples and then multiplies the original version of the frame by the shifted version to complete the aforementioned autocorrelation process. FS processor 235 then locates the beginning of a frame by discarding any leading sample not having a strong peak of energy, and continues such discarding until it locates the sample containing the strong peak of energy. Processor 235 then marks the latter sample as the beginning of a frame. The number, M, of samples so discarded is supplied to M shift circuit 245. FS processor 235 then supplies the detected frame and succeeding frames to IS processor 240 which locates the frames that had been marked as interleaver frames at the transmitter.

Processor 240 performs the interleaver synchronization function by accumulating a predetermined number of the frames, e.g., 414 frames, supplied by processor 235. Processor 240 then scans the array of frames to locate the frames so marked at the transmitter as interleaver frames, e.g., frames 0, 10, 340 and 400. Once processor 240 locates the marked frames, it then sends identifiers respectively noting the locations of the marked frames to conventional DSP processor 250 via path 241.

As mentioned above, although the bandpass filtered signal may be used in performing the frame and interleaver synchronization functions, such filtering further corrupts the integrity of the transmitted data. We have recognized, however, that the unfiltered signal may still be used to retrieve the original information transmitted in the side bands. To do this, we shift the signal outputted by circuit 225 by M samples, i.e., the number of samples that FS processor shifted the filtered samples to locate the beginning of a frame. M shift circuit 245 then shifts the unfiltered samples by M samples discarding the latter samples, M samples, and supplies the succeeding samples to output processor 250 via path 246.

Figure 4:
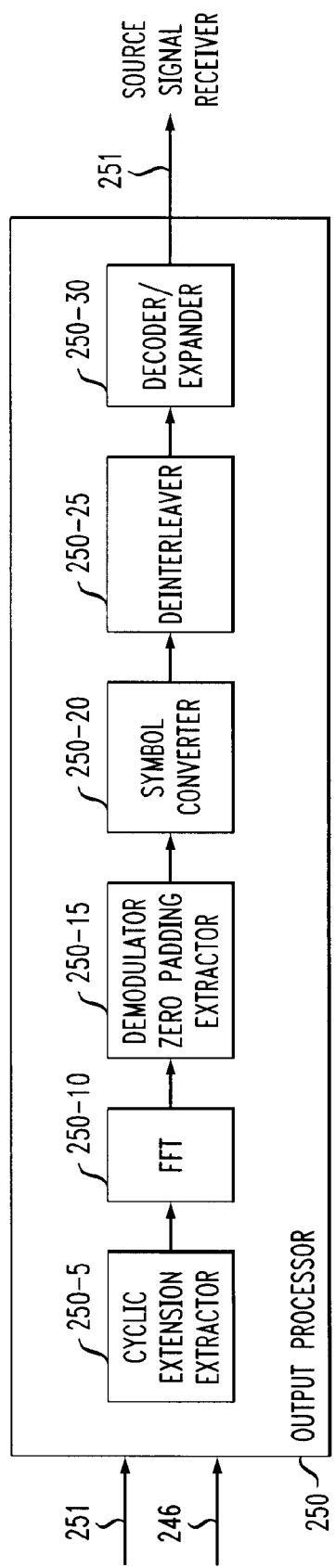
FIG. 4 is broad block diagram of the output processor of FIG. 3.

A functional block diagram of output processor 250 is shown in FIG. 4. In particular, cyclic extension extractor 250-5 removes the cyclic extension from each of the frames that output processor 250 receives via path 246. That is, extractor 250-5 "reverses" the operation performed by processor 120-30 (FIG. 2). The revised frame is then supplied to conventional FFT processor 250-10, which runs the revised frame through a Fast Fourier Transform (FFT) function. Processor 250-10 then passes the frame of symbols to conventional symbol converter 250-20. Symbol converter 250-20 converts the frame of symbols into a frame of respective data bits (bytes) and supplies the result to de-interleaver process 250-25.

De-interleaver 250-25, more particularly, stores the frames that it receives in reverse order in an array buffer (i.e., column by column) to deinterleave the data. It then checks the array using the interleaver markers (identifier) received via path 241 to determine if the interleaver frames are at their expected locations. If not, then processor 245 moves its buffer pointers to include the next succeeding frame that it receives from converter 250-20 in the array and rechecks the array in the described manner for proper deinterleaving. Processor 245 repeats this process until the array is properly deinterleaved. At that point, processor 250 supplies each of the deinterleaved frames forming the array in sequence to decoder/expander 250-30. Decoder/expander processor 250-30 first decodes each deinterleaved frame that it receives using a particular decoding technique, e.g., a so-called Viterbi decoder. Processor 250-30 then expands (decompresses) the decoded frame to re-generate the original source signal supplied to coder 120-5 (FIG. 2) and outputs the original source signal to a receiver via path 251, all in accordance with the principles of the invention.

It will thus be appreciated that, although the invention illustrated herein is described in the context of a specific illustrative embodiment, those skilled in the art will be able to devise numerous alternative arrangement which, although, not explicitly shown or described herein, nevertheless, embody the principles of the invention and are within its spirit and scope. For example, although the principles of the invention were discussed in the context of an OFDM transmission system operating within the side bands of a FM carrier, such principles may be readily applied to other forms of transmission systems, wireless or wired, since they are also susceptible to signal interference.

We claim:

1. A signal transmission system comprising
    a transmitter for transmitting a host signal over a predetermined carrier signal having side bands and for transmitting source information as respective frames of source information within the side bands, wherein the source information is transmitted as interleaved source information in which particular ones of the frames of the interleaved source information are marked as, interleaver frames,
    a receiver for receiving the transmitted signals, and for separating the host signal from the source information and directing the host signal to an intended output, and directing the source information to a processor, said processor comprising
        a converter for converting the source information from analog signals to a digitally sampled signals,
        a bandpass filter tuned to a predetermined range of frequencies for filtering the digital signals,
        first processor means for processing the filtered sampled signals to locate at least the beginning of a respective one of said frames, and outputting an indicator indicative of the number of said samples so processed before said beginning was located,
        second processor means for shifting, as a function of said number, the unfiltered digitally sampled signals outputted by said converter to locate the beginning of a frame of the unfiltered digitally sampled signals, third processor means, responsive to an indication that the first processor means has located the beginning of a frame, for further processing the filtered frames of digital samples to identify those frames marked as interleaver frames, and said second processor means processing the first located frame and succeeding frames of the unfiltered digitally sampled signals to recover the respective transmitted source information.

2. The signal transmission system of claim 1 further comprising apparatus, responsive to receipt of the identities of the frames that have been marked as interleaver frames and receipt of the frames of the unfiltered digitally sampled signals, for deinterleaving the digital samples forming the latter frames, and further processing the deinterleaved frames to recover the source information.

3. The transmitter of claim 1 further comprising apparatus for forming the source information into respective frames of digital samples characterizing the source information, interleaving the samples forming a predetermined number of frames of samples, and adding a cyclic extension signal to each of the interleaved frames to identify the beginning of each of those frames.

4. The system of claim 1 wherein the transmission system is an orthogonal frequency division multiplexed system in which a group of samples is coded into a corresponding symbol for transmission to the receiver.

5. The signal transmission system of claim 1 wherein said bandpass filter is a finite impulse response filter.

6. The transmission system of claim 1 wherein the transmitted carrier is a FM signal carrier.

7. The transmission system of claim 1 wherein the transmission system is a wireless transmission system.

8. The transmission system of claim 1 wherein the transmission system is a wired transmission system.

9. A receiver for receiving a transmitted signal composed of a host signal and coded source information, in which the coded source information is transmitted within side bands of the transmitted signal, the receiver comprising the receiver receiving the source information as interleaved source information in which particular ones of the frames of the interleaved source information have been marked as interleaver frames, first apparatus for separating the host signal from the coded source information, for respectively supplying the host signal and coded source information to first and second receiver sections for processing, the first section further processing the host signal and outputting the processed result to an intended output, the second section comprising a converter for converting the coded source information into respective digital samples, a filter, having a predetermined signal filtering characteristic, for filtering each of the digital samples, second apparatus for locating the beginning of a frame within the filtered samples and outputting an indicator indicative of a number of filtered samples processed before the beginning of the frame was located, a first processor for locating, as a function of the outputted indicator, the beginning of a frame within the unfiltered digital samples, a second processor responsive to an indication that the first mentioned processor has located the beginning of a frame, for further processing the filtered frames of digital samples to identify those frames marked as interleaver frames, and said first processor decoding each frame of unfiltered digital samples to recover the source information.

10. The receiver of claim 9 further comprising third apparatus, responsive to receipt of the identities of the frames that have been marked as interleaver frames and receipt of the frames of the unfiltered digitally sampled signals, for deinterleaving the digital samples forming the latter frames, and further processing the deinterleaved frames to recover the source information.

11. The receiver of claim 9 wherein the source information signal is an orthogonal frequency division multiplexed signal in which a group of samples is coded into a corresponding symbol for transmission to the receiver.

12. The signal transmission system of claim 9 wherein said filter is a bandpass filter is a finite impulse response filter.

13. The receiver of claim 9 wherein the transmitted signal is a FM signal carrier.

14. The receiver of claim 9 wherein the transmitted signal is transmitted over a wireless transmission system.

15. The receiver of claim 9 wherein the transmitted signal is transmitted over a wired transmission system.

16. A method of operating a signal transmission system comprising transmitting a host signal over a predetermined carrier signal having side bands, and transmitting source information as frames of source information within the side bands, wherein the source information is transmitted as interleaved source information in which particular ones of the frames of the interleaved source information are marked as interleaver frames, receiving the transmitted signals, separating the host signal from the source information, directing the host signal to an intended output, and directing the source information to a processor, at said processor converting the received source information into digitally sampled signals, filtering the digitally sampled signals in accordance with a bandpass filter tuned to a predetermined range of frequencies, first processing the filtered sampled signals to locate at least the beginning of a respective one of said frames, and outputting an indicator indicative of the number of said samples so processed before said beginning was located, shifting, as a function of said number, the unfiltered digitally sampled signals to locate the beginning of a frame of unfiltered digitally sampled signals, responsive to an indication that the first processing has located the beginning of a frame, further processing the filtered frames of digital samples to identify those frames marked as interleaver frames, and processing the first located frame and succeeding frames of the unfiltered digitally sampled signals to recover the respective transmitted source information.

17. A method of operating a receiver that receives a transmitted signal composed of a host signal and coded source information, in which the coded source information is transmitted within side bands of the transmitted signal, the method comprising the steps of, separating the host signal from the coded source information, wherein the coded source information has been received as interleaved source information in which particular ones of the frames of the interleaved source information have been marked as interleaver frames, respectively supplying the host signal and coded interleaved source information to first and second receiver sections for processing, in which the first section includes a step of processing the host signal and outputting the processed result to an intended output, at the second section converting the coded interleaved source information into respective digital samples, using a filter having a predetermined signal filtering characteristic, to filter each of the digital samples, locating the beginning of a frame within the filtered samples, and outputting an indicator indicative of a number of filtered samples processed before the beginning of the frame was located, locating, as a function of the outputted indicator, the beginning of a frame within the unfiltered digital samples and decoding each frame of unfiltered digital samples to recover the source information, and responsive to an indication the beginning of a frame within the filtered samples has been located, further processing the filtered frames of digital samples to identify those frames marked as interleaver frames.

* * * * *